United States Patent
Palmberg et al.

(10) Patent No.: US 7,389,848 B2
(45) Date of Patent: Jun. 24, 2008

(54) HYDRAULIC POWER STEERING ASSISTANT

(75) Inventors: Jan-Ove Palmberg, Linköping (SE); Jochen Pohl, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 10/660,471

(22) Filed: Sep. 10, 2003

(65) Prior Publication Data

US 2005/0051377 A1  Mar. 10, 2005

(51) Int. Cl.
*B62D 5/06* (2006.01)

(52) U.S. Cl. .................. 180/422; 180/415; 180/421; 180/423; 180/441

(58) Field of Classification Search ......... 180/414–417, 180/441, 442, 421–423
See application file for complete search history.

(56) References Cited

U.S. PATENT DOCUMENTS

| | | | |
|---|---|---|---|
| 4,776,419 A * | 10/1988 | Walton | 180/414 |
| 4,819,545 A * | 4/1989 | Dymond | 91/371 |
| 4,909,342 A * | 3/1990 | Janson et al. | 180/414 |
| 5,029,513 A * | 7/1991 | Duffy | 91/31 |
| 5,119,898 A * | 6/1992 | Eckhardt et al. | 180/422 |
| 5,203,421 A * | 4/1993 | Ueno et al. | 180/417 |
| 5,303,793 A * | 4/1994 | Kato et al. | 180/417 |
| 5,511,630 A * | 4/1996 | Kohata et al. | 180/422 |
| 5,513,720 A | 5/1996 | Yamamoto et al. | |
| 5,517,096 A * | 5/1996 | Shtarkman et al. | 318/434 |
| 5,593,002 A * | 1/1997 | Okada et al. | 180/421 |
| 5,713,429 A * | 2/1998 | Doolittle | 180/423 |
| 6,305,490 B1 * | 10/2001 | Loos et al. | 180/441 |
| 6,431,306 B1 * | 8/2002 | Bishop et al. | 180/421 |
| 2002/0139605 A1 * | 10/2002 | Modrzejewski et al. | 180/417 |

* cited by examiner

*Primary Examiner*—Lesley D. Morris
*Assistant Examiner*—Maurice Williams
(74) *Attorney, Agent, or Firm*—Novak Druce + Quigg LLP (57) ABSTRACT

The invention generally relates to an improvement of conventional Hydraulically Power Assisted Steering system (HPAS-system) arranged to supply a steering assist force to the steering assembly of a vehicle as a response to a torque applied by a driver to the steering wheel. In such HPAS-systems a certain drivers torque always results in a certain assist force. The invention therefore discloses a valve that can be actuated to dynamically alter the steering assist force produced by the HPAS-system. This makes it possible to dynamically adjust the assist force so that an appropriate force may be delivered to fit the specific driving scenario.

2 Claims, 7 Drawing Sheets

HYDRAULIC POWER STEERING ASSISTANT

FIELD OF THE INVENTION

The present invention generally relates to a Hydraulically Power Assisted Steering system (HPAS-system) arranged to supply a steering assist force to the steering assembly of an automobile or a vehicle. In particular the invention relates to an HPAS-system including a rotary valve unit, which may be actuated to dynamically alter the steering assist force produced by the HPAS-system.

DESCRIPTION OF RELATED ART

Various steering arrangements for assisting a driver in steering an automobile or a vehicle are well known in the art. Especially it is well known that the turning direction of a vehicle can be maneuvered by a steering wheel that is mechanically connected to the road wheels through a steering assembly. In assisting the driver it is common to use an auxiliary system to generate an additional steering force, which is applied to the steering assembly of the vehicle. The additional steering force is suitably adapted to reduce the effort required by the driver in changing the direction of the road wheels.

Traditionally, various Hydraulic Power Assisted Steering (HPAS) systems have been used to add a certain amount of assist force to the steering assembly of a vehicle. These traditional HPAS-systems are typically based on an assist characteristic, a so-called boost-curve. The shape of a boost-curve is typically and essentially determined by the design of the valve and the pump of the HPAS-system. The boost-curve in a traditional HPAS-system is therefore static.

According to the function of a traditional boost-curve a certain torque applied by the driver to the steering wheel result in a certain predetermined assist force supplied by the HPAS-system to the steering assembly of the vehicle. This predetermined assist force increases as the driver applies more torque to the steering wheel, and decreases as the driver applies less torque to the steering wheel. The use of a static boost-curve gives a static relation between a steering effort required from the driver and a corresponding assist force supplied by the HPAS-system, i.e. the relation follows a static and predetermined curve.

Nevertheless, the amount of steering effort required from the driver and the appropriate assist force that should be supplied by the HPAS-system may vary depending on various external circumstances and especially dependent upon the specific driving scenario, e.g. dependent upon the vehicle speed, the vehicle turning angle etc. Future customer functions such as my-split braking aid or Lane Keeping Aid demand more flexible solutions in terms of steering wheel assist force.

From the steering gears perspective this presupposes a more dynamic change in the relation between assist force and drivers torque. This can be achieved with an Electric Power Assisted Steering (EPAS) using an electric motor to supply an assist torque to the vehicle steering assembly. Consequently, the introduction of new steering related customer functions in passenger cars essentially depends of the implementation of EPAS-systems.

However, some HPAS-system has been developed to achieve a more dynamic change in the relation between assist force and drivers torque.

U.S. Pat. No. 5,593,002 (Okada et al.) shows a HPAS-system comprising a rotary valve unit actuated according to a twisting angle provided in a torsion bar connected between an input shaft and a pinion shaft and a pinion, and a conversion mechanism which can change the condition of the rotary valve unit for a given twisting angle of the torsion bar. It should be noted that the flow of oil through the rotary valve in Okada is not directly affected by said change of valve condition. However, when a torque is applied to the steering wheel more or less oil may flow through the valve depending on the valve operative condition, see e.g. col. 5 line 41-col. 6 line 63. The change of condition in Okada may be seen as a multiplicative or lever system affected by the speed of the vehicle.

U.S. Pat. No. 5,513,720 (Yamamoto et al.) shows a HPAS-system that comprises a steering mechanism having a torsion bar, a rotary valve connected to an oil pump and disposed between an input shaft and an output shaft, a valve driving mechanism having a pressed portion projected on either the input shaft or the output shaft and a plunger on the one shaft of the input shaft or output shaft on which the pressed portion is not projected for pressing the pressed portion, setting a target assist force of an assist force obtained by rotating the rotary valve in the torsion direction of the torsion bar and an assist force obtained by rotating the rotary valve in the reverse direction to the torsion direction, a plunger driving mechanism for driving the plunger so that the preset assist force is obtained, controlling the pressure itself of the rotary valve to the operation angle of the rotary valve. This arrangement may be used to achieve a more dynamic change in the relation between assist force and driver torque. However, it should be noted that the rotary valve is rotated by generating in the torsion bar 9 a torsional moment in the forward direction (right direction) or in the reverse direction (left direction), see e.g. col. 8 lines 33-49. This means that the torsion bar is exposed to extra tensional strain, which reduces its deflecting response to driver-applied torque and which may reduce the useful life of the torsion bar. Moreover, the force needed to deflect the torsion bar is fairly large, with a bulkier and heavier construction as a consequence.

To summarise, the prior art cited above may in some respect offer a solution to achieve a more dynamic change in the relation between assist force and drivers torque in an HPAS-system. However, the prior art have several drawbacks.

SUMMARY OF THE INVENTION

The invention offers a simple solution to enable a dynamic change in the relation between assist force and drivers torque in an HPAS-system. In particular, the invention offers a solution that may be implemented by simple modifications of conventional HPAS-systems, comprising a rotary valve actuated according to a twisting angle provided in a torsion bar or a similar deflecting device or turnable device connected between a steering shaft attached to a steering wheel and a pinion shaft or similar attached to the steering rack or similar, where the actuation of the rotary valve determines the assist force $F_{ass}$ that is supplied by the HPAS-system to the steering assembly of the vehicle.

Such conventional HPAS-systems may be understood as a servo system having a controller that tries to minimize or reduce the angular difference $\alpha_A$ between the turning angle $\alpha_{sw}$ of the steering wheel and the turning angle $\alpha_{ps}$ of the pinion shaft. In other words these conventional HPAS-systems may be understood as a servo system that tries to reduce or minimize any twisting of the torsion bar.

However, the invention is not limited to conventional HPAS-systems and it should be understood that the torsion bar and other parts of the vehicle steering assembly may be substituted for other parts having the same or similar function, provided that the rotary valve may be actuated to reflect a larger angular difference $\alpha_A$ when the driver applies more torque to the steering wheel and actuated to reflect a smaller angular difference $\alpha_A$ when the driver applies less torque to the steering wheel.

As previously stated in the background of the invention the use of a conventional HPAS-system having a static boost-curve gives a static relation between the steering effort required from the driver and the corresponding assist force supplied by the HPAS-system. In other words, the relation between drivers torque and assist force follows a static and predetermined curve, whereby a specific $\alpha_A$ results in a specific assist force $F_{ass}$. Obviously there is a need for a more flexible solution than the one offered by the static solution in conventional HPAS-systems.

The invention therefore discloses an arrangement and a method that i.a. enables a varying offset angle $\alpha_{off}$ to be more or less dynamically added to or subtracted from the angular difference $\alpha_A$ between the steering wheel turning angle $\alpha_{sw}$ and the turning angle of the pinion shaft $\alpha_{ps}$, i.e. $\alpha_A \pm \alpha_{off}$.

This may be accomplished by arranging one part of the rotary valve to be non-rotatably supported on the vehicle steering shaft, while another part of the rotary valve, e.g. the valve house, may be supported on the pinion shaft so that it may be displaced in relation to the pinion shaft, preferably rotatably displaceable a small angle $\alpha_{off}$ with respect to the pinion shaft. The valve house may then rotate together with the supporting pinion shaft, however displaced by a small angle $\alpha_{off}$ with respect to the pinion shaft. The same applies mutatis mutandis if the valve house or similar part is alternatively supported on the steering shaft.

This means that an angular difference $\alpha_A$ reflected by the rotary valve may be increased by an small offset angle $+\alpha_{off}$, which further opens the rotary valve to increase the hydraulic pressure in a hydraulic piston or similar for supplying an increased steering assist force $F_{\Delta ass}$ to the steering rack, resulting in a total amount of steering assist force $F_{ass}+F_{\Delta ass}$. The angular difference $\alpha_A$ may conversely be decreased by a small offset angle $-\alpha_{off}$, which slightly closes the rotary valve to decrease the hydraulic pressure for supplying an decreased steering assist force $F_{ass}-F_{\Delta ass}$.

By arranging the valve house or similar part of the rotary valve to be dynamically actuated a small offset angle $\alpha_{off}$ in relation to the supporting pinion shaft it is possible to dynamically adjust the assist force $F_{ass}$ corresponding to an angle $\alpha_A$, with a certain amount of assist force $\pm F_{\Delta ass}$, corresponding to an offset angle $\pm \alpha_{off}$, so that an appropriate assist force $F_{ass} \pm F_{\Delta ass}$ is delivered by the HPAS-system to fit the specific driving scenario, where a control mechanism determines the offset angle $\alpha_{off}$ depending on at least one external or internal vehicle input parameter.

The forces needed to obtain a displacement or an offset—e.g. an offset angle $\alpha_{off}$—by directly actuating a part of a rotary valve are fairly low, mainly comprising flow forces created within the valve and friction forces emanating from the actuated valve part.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

Reference signs in the Figures are as follows:

| Ref. | Feature |
| --- | --- |
| 100 | Hydraulic Power Assisted Steering System (HPAS-system) |
| 120 | Steering Wheel |
| 121 | Steering Shaft |
| 122 | Pinion Shaft |
| 123 | Pinion Gear Assembly |
| 124 | Rack |
| 125 | Tie Rods |
| 126 | Connector Rods |
| 127 | Road Wheels |
| 128 | Servo Pump |
| 129 | Servo-Motor |
| 130 | Interconnecting Assembly |
| 135 | Lid |
| 140 | Treaded Bolts |
| 210 | Torsion Bar |
| 220 | Serrated Coupling |
| 225 | Coupling Arrangement |
| 300 | Rotary Valve |
| 305 | First Cylindrical Valve Member |
| 310 | Second Cylindrical Valve Member |
| 315 | Inlet Through-Hole |
| 320 | First Chamber |
| 325 | First Outer Through-Hole |
| 330 | First Inner Through-Hole |
| 335 | Second Chamber |
| 340 | Second Inner Through-Hole |
| 345 | Second Outer Through-Hole |
| 350 | Third Chamber |
| 360 | Outlet Through-Hole |
| 370 | Flange Portion |
| 371 | Recess Chamber |
| 372 | Inlet-Outlet Port |
| 373 | Inlet-Outlet Port |
| 374 | Wall Portion |
| 400 | Cog Wheel |
| 405 | Cog Wheel Shaft |
| 410 | Electric Stepping Motor |
| 415 | Cogged Ring |
| 500 | Electric Stepping Motor |
| 505 | Eccentric Axis |
| 510 | Diagonal Slot |
| 511 | Rivet |
| 515 | Cylindrical Flange Portion |
| 520 | Valve House |
| 525 | Empty Space |
| 530 | Guide Flange |

DETAILED DESCRIPTION OF THE INVENTION

The HPAS-System

Figure 1:
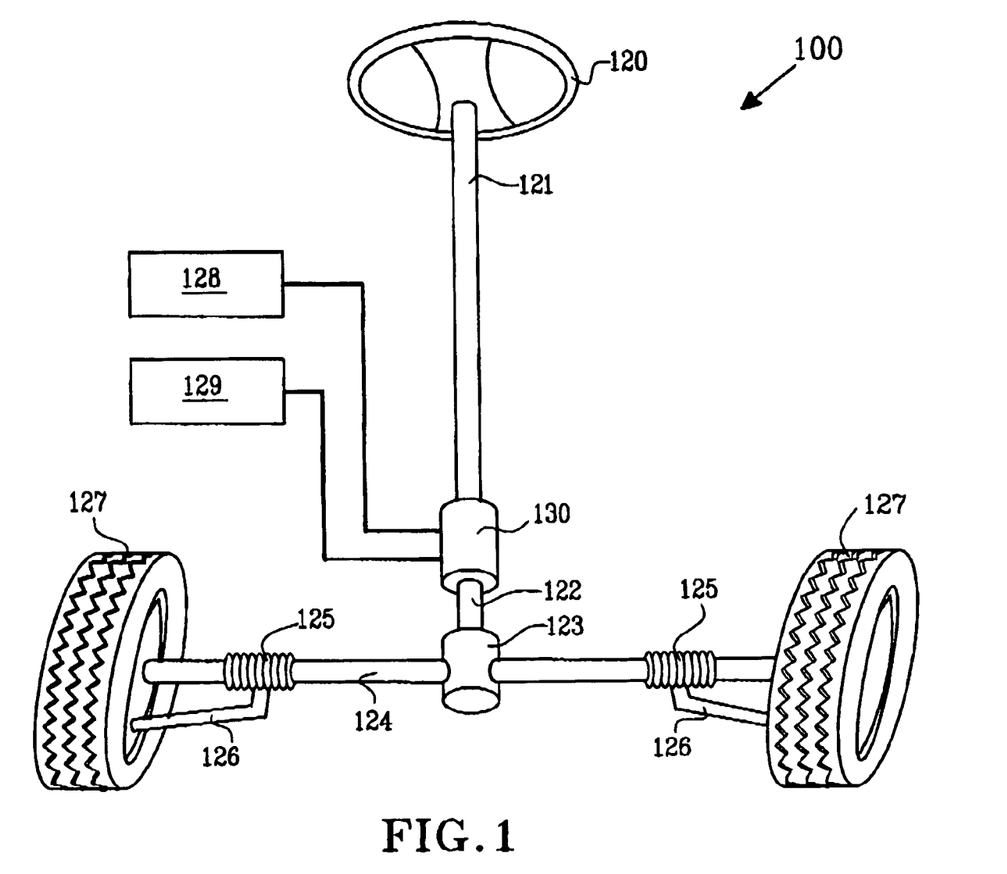
FIG. 1 shows a diagrammatic view of an HPAS-system for a wheeled vehicle according to the present invention.

Referring to FIG. 1, a Hydraulic Power Assisted Steering system 100 (hereinafter denoted HPAS-system) is illustrated. The HPAS-system 100 is preferably a system for use for steering the road wheels of an automobile or a vehicle, which system 100 is equipped with a rotary valve 130 according to the present invention. Although the HPAS-system 100 is described in connection with a hydraulic power assisted steering of road wheels of an automobile, it should be appreciated that the HPAS-system 100 according to the present invention may be employed to steer any number of front and/or rear wheels or other propulsion equipment of a steered vehicle.

The HPAS-System Steering Assembly

The HPAS-system 100 shown in FIG. 1 comprises a steering assembly, i.a. comprising a steering wheel 120. The steering wheel 120 is generally disposed in the vehicle passenger compartment and manually operated by the driver of the vehicle to steer the road wheels 127. Further, the steering assembly includes a steering shaft 121, operatively coupled to the steering wheel 120. Said steering shaft 121 rotates in synchronization with the steering wheel 120 and is preferably directly attached to the steering wheel 120. The steering assembly also employs a pinion shaft 122, operatively engaged with steering shaft 121. The steering shaft 121 and the pinion shaft 122 are interconnected via an interconnecting assembly 130. Said pinion shaft 122 is preferably coupled at one end to a pinion gear assembly 123 for converting angular rotation of the pinion shaft 122 to linear movement of a rack 124, where the rack 124 is coupled on opposite ends to tie rods 125 and connector rods 126, which are movable to control left and right rotation of the road wheels 127.

It should be appreciated that the steering wheel 120, the steering shaft 121, the pinion shaft 122, the pinion gear assembly 123, the rack 124, the tie rods 125, the connector rods 126 and the road wheels 127 as shown in FIG. 1 only illustrates one of several suitable steering assemblies known to the person skilled in the art. It follows that the invention is not limited to the steering assembly shown in FIG. 1.

Moreover, as will be further explained below the interconnecting assembly 130 of the steering assembly i.a. comprises a torsion bar 210 and a rotary valve 300 connected to a servo pump 128 (schematically indicated in FIG. 1) for the supply of pressurized servo fluid, as is well known in the vehicle steering art. The rotary valve 300 is further connected to a hydraulic servo-motor 129 (schematically indicated in FIG. 1) that is arranged for supplying a steering assist force to the steering assembly, so as to reduce the steering effort required by the driver in changing the direction of the road wheels 127, as is also well known in the vehicle steering art. The servo-motor 129 may e.g. be a piston arrangement for supplying an assist force to the rod 124 or a rotating arrangement for supplying an assist torque to the pinion shaft 122, or some other suitable hydraulic arrangement.

The Interconnecting Assembly and the Rotary Valve

Figure 2:
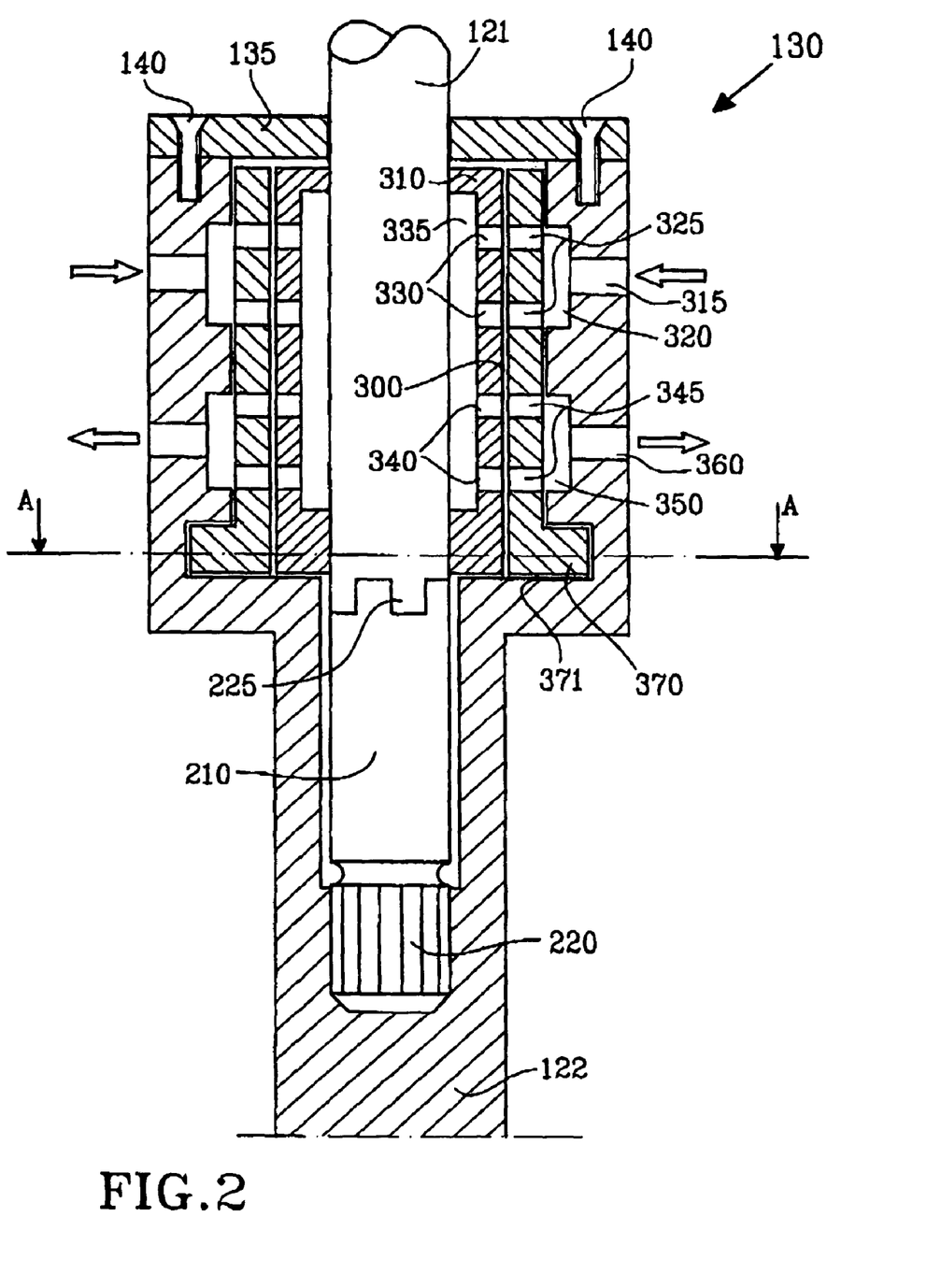
FIG. 2 shows a cross-section of the interconnection assembly 130.

The interconnecting assembly schematically 130 indicated in FIG. 1 is further illustrated in FIG. 2. As is shown in FIG. 2 one end of the torsion bar 210 is operatively connected to the pinion shaft 122 via a serrated coupling 220, whereas the other end of the torsion bar 210 is operatively coupled to the steering shaft 121 via a coupling arrangement 225, e.g. a suitable toothed coupling or a claw coupling.

Further, the interconnecting assembly 130 comprises a rotary valve 300. As illustrated in FIG. 2 the rotary valve 300 may be enclosed inside an extension of the pinion shaft 122 sealed e.g. by a lid 135 and threaded bolts 140. Alternatively and conversely, the rotary valve 300 may be arranged on the outside of the shafts so as to enclose and surround a part of the pinion shaft 122, a part of the steering shaft 121, and a part of the torsion bar 210, and possibly also other components of an interconnecting assembly 130.

The rotary valve 300 in FIG. 2 illustrates the principles of an exemplary rotary valve. Possible sealing arrangements and other details well known by a person skilled in the art to be a part of a rotary valve has been omitted for the sake of clarity.

The rotary valve 300 illustrated in FIG. 2 comprises a first cylindrical valve member 305 and a second cylindrical valve member 310, adapted to regulate the flow of a hydraulic fluid such as oil or similar. The first cylindrical valve member 305 may in a preferred embodiment constitute a part of the valve house. The second cylindrical valve member 310 is drive or press fitted on the steering shaft 121 and consequently arranged to rotate together with the steering shaft 121, whereas the first valve member 305 is rotatably or turnable connected to the pinion shaft 210, such that the first valve member 305 may rotate together with the pinion shaft 122 at an offset angle $\alpha_{off}$ with respect to the pinion shaft 122.

The right side structure of the rotary valve 300 in FIG. 2 will now be described with reference to numbered parts in FIGS. 2, 3 and 4.

The extension of the pinion shaft 122 comprising the rotary valve 300 in FIG. 2 has an inlet through-hole 315 for receiving a pressurized hydraulic fluid from the servo pump 128, and a first chamber 320 communicating with two first outer through-holes 325 arranged in the first cylindrical valve member 305, where the first outer through-holes 325 are adapted to dynamically communicate with a corresponding pair of first inner through-holes 330 arranged in the second cylindrical valve member 310 where the first inner through-holes 330 communicate with a second chamber 335 arranged inside the second cylindrical valve member 305.

Said second chamber 335 communicates with a second pair of inner through-holes 340 arranged in the second cylindrical valve member 310, where the second pair of inner through-holes 340 are adapted to dynamically communicate with a second pair of outer through-holes 345 arranged in the first cylindrical valve member 305, where the second outer through-holes 345 communicate with a third chamber 350, which in turn communicates with an outlet through-hole 360 for an outlet of the received pressurized hydraulic fluid, where both the third chamber 350 and the outlet through-hole 360 are arranged in the extension of the pinion shaft 122 for supplying pressurized hydraulic fluid to the servo-motor 129.

Figure 3:
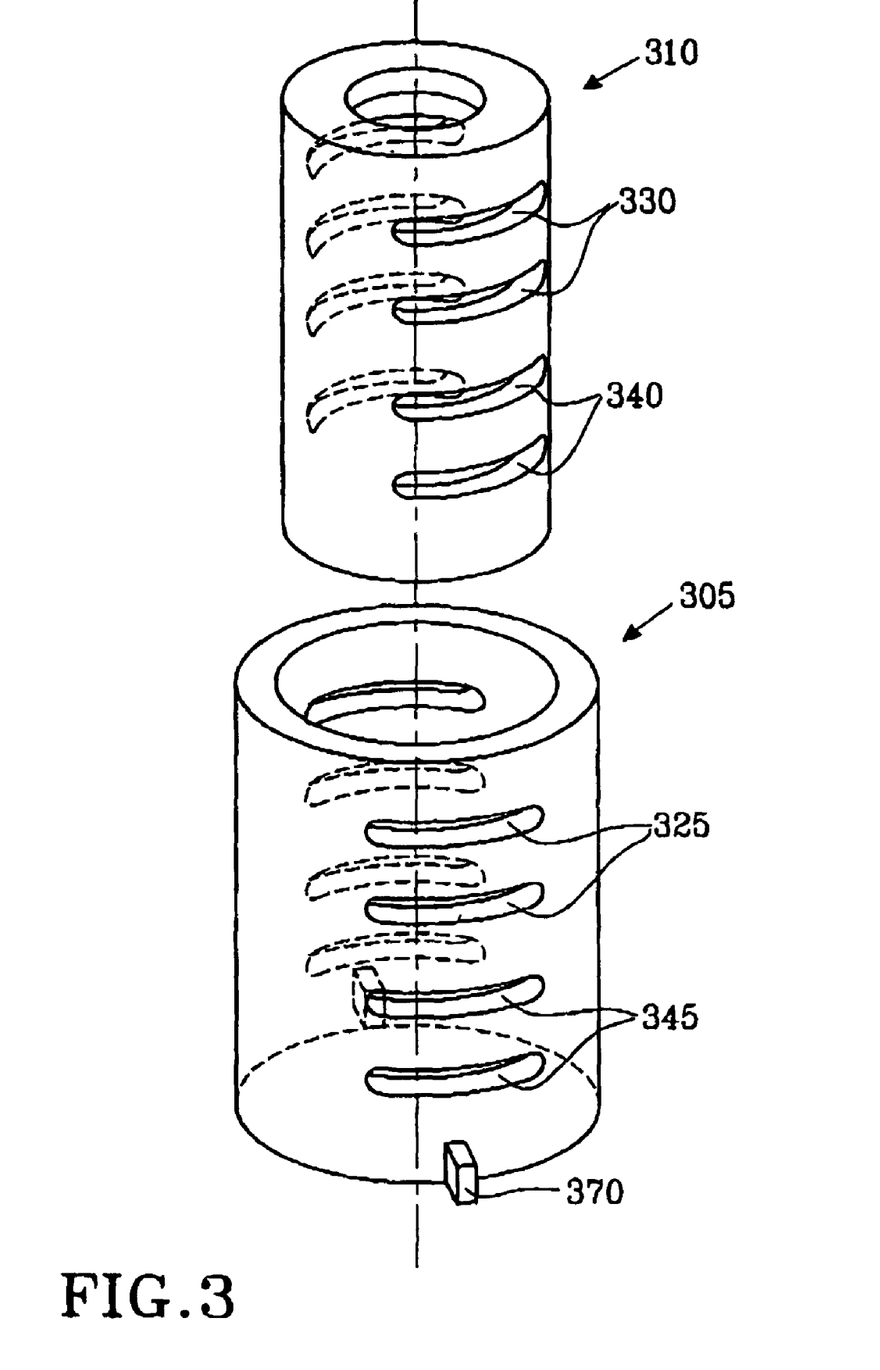
FIG. 3 shows a perspective view of the first and second cylindrical valve member 305, 310.

The first cylindrical valve member 305 and the second cylindrical valve member 310 of the rotary valve 300 are further illustrated in FIG. 3, showing a perspective view of the members 305, 310, where the member 310 has been lifted from the member 305. The members 305, 310 are illustrated with the through-holes 330, of member 310 in a position where they partly coincide with the through-holes 325, 345 of member 305 if the two members 305, 310 had been put together in an operative position, i.e. if the members 305, 310 had been operatively arranged in a rotary valve 300 as shown in FIG. 2. Such an operative position of the through-holes 330, 340, 325, 345 indicates that there is an angular difference $\alpha_\Delta$ between the turning angle $\alpha_{sw}$ of the steering wheel and the turning angle $\alpha_{ps}$ of the pinion shaft, e.g. caused by a driver turning the steering wheel 120. When the through-holes 330, 340 in an operative position coincide with the through-holes 325, 345 a flow of pressurized hydraulic fluid passes from the servo-pump 128 through the rotary valve 300 and to the servo-motor 129 as described above, whereupon the servo-motor 129 may deliver an assist force $F_{ass}$ to reduce the steering effort required by the driver in changing the direction of the road wheels 127.

It should be added that the valve members 305, 310 may preferably be operatively arranged to vary the position of the through-holes 330, 340 and 325, 345 from a complete overlap, corresponding to a large $\alpha_\Delta$, to a gradual decrease of the overlap, corresponding to a decrease in $\alpha_\Delta$, where no overlap at all corresponds to $\alpha_\Delta=0$. Where there is no overlap at all there is consequently no flow of hydraulic fluid to the servo-motor and there is consequently no assist force $F_{ass}$ delivered from the servo-motor.

The rotary valve 300 may also comprise a flange portion 370 formed as a protrusion of the first cylindrical valve member 305 and arranged at the lower end of said member 305. The flange portion 370 protrudes into a recess chamber 371 arranged in the extended portion of the pinion shaft 122, as can be seen, in FIG. 2. The flange portion 370 and the recess chamber 371 are further illustrated in FIG. 4, showing a cross section of the interconnection assembly 130 cut through the line A-A in FIG. 2. As can be seen in FIG. 4 the recess chamber has a first inlet-outlet port 372 arranged to the right and a second inlet-outlet port 373 arranged to the left, arranged to receive and expel hydraulic fluid. The flange portion 370 is arranged to rotate an offset angle $\pm\alpha_{off}$ together with the first cylindrical valve member 305, as illustrated by the two opposite arrows in FIG. 4. The maximum rotation angle $\alpha_{max}$ in this embodiment is determined by the size of the recess chamber 317, extending as a cut ring-shaped circle-segment along the wall of the pinion shaft 122. It is further preferred that the flange portion 370 is tightly arranged towards a wall portion 374 of the recess chamber 371, formed by the outer wall periphery of the pinion shaft 122, so as to cut the recess chamber 371 into a left and a right hydraulic chamber. In this way the first cylindrical valve member 305 may be rotated clockwise a small offset angle $\alpha_{off}$ by increasing the hydraulic pressure in the right hydraulic chamber and decreasing the hydraulic pressure in the left chamber, whereas the first cylindrical valve member 305 may be rotated counter clockwise a small offset angle $\alpha_{off}$ by increasing the hydraulic pressure in the left hydraulic chamber and decreasing the hydraulic pressure in the right chamber. Hence, once a certain hydraulic pressure has been established in said chambers the first cylindrical valve member 305 will rotate together with the pinion shaft 122, however possibly displaced by an small angle $\alpha_{off}$ with respect to the pinion shaft.

By a dynamic change of the hydraulic pressure in said right and left chamber it is possible to dynamically adjust the assist force $F_{ass}$, corresponding to an angle $\alpha_A$, with a certain amount of assist force $\pm F_{\Delta ass}$, corresponding to an offset angle $\pm\alpha_{off}$, so that an appropriate assist force $F_{ass} \pm F_{\Delta ass}$ is delivered by the servo-motor 129 to fit the specific driving scenario, where a control mechanism determines the offset angle $\alpha_{off}$ depending on at least one external or internal vehicle input parameter, e.g. vehicle speed, vehicle acceleration, vehicle turning angle etc. The choice of control mechanism is not important to the present invention and it may e.g. be any suitably programmed computer system.

Figure 4:
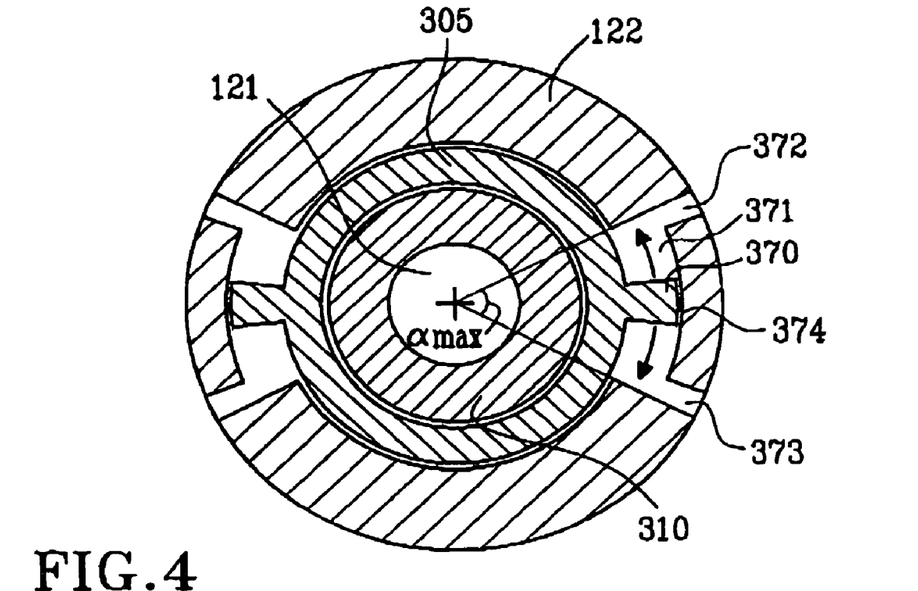
FIG. 4 shows a cross section of the interconnection assembly 130 cut through the line A-A in FIG. 2.

The right side structure of the rotary valve 300 has now been described with numbered references to the different parts in FIGS. 2, 3 and 4. A corresponding left side structure of the rotary valve 300 is also illustrated in FIG. 2. The left side structure has the same function and the same parts as the right side structure and the left side structure is therefore not described in any detail. However, it should be noted that the right side and the left side are preferably separated for supplying a left chamber and a right chamber respectively in a piston arrangement that supplies an assist force to the rod 124.

The invention is not limited to the rotary valve 300 illustrated in FIGS. 2, 3 and 4. On the contrary, a rotary valve according to the present invention embodiments may e.g. have only one inlet through-hole 315 and one outlet through-hole 360, in which case there may be only one first, second and third chamber 315, 335 and 350 and such an embodiment may only have the through-holes 325, 330, 340, 345, where said chambers and said through-holes may extend a full circle or nearly a full circle around the steering shaft 121. Moreover, some embodiments may have only one first through-hole 325, 330 and/or only one second through-hole 340, 345, whereas other embodiments may have three or more such through-holes. In addition, the through-holes 325, 330, 340, 345 in the first and second cylindrical valve member 305, 310 are not limited to any specific shape. On the contrary, they may have any suitable shape, e.g. rounded, elongated and/or angular. In addition, the through-holes 325, 330, 340, 345 may be arranged in any suitable direction, e.g. more or less in the axial direction with respect to the shafts 121, 122 and/or more or less in the rotational direction of the shafts 121, 122.

In brief, the present invention may generally be implemented in a vast variety of rotary valves that is well known to a person skilled in the art.

Other Embodiments

Figure 5:
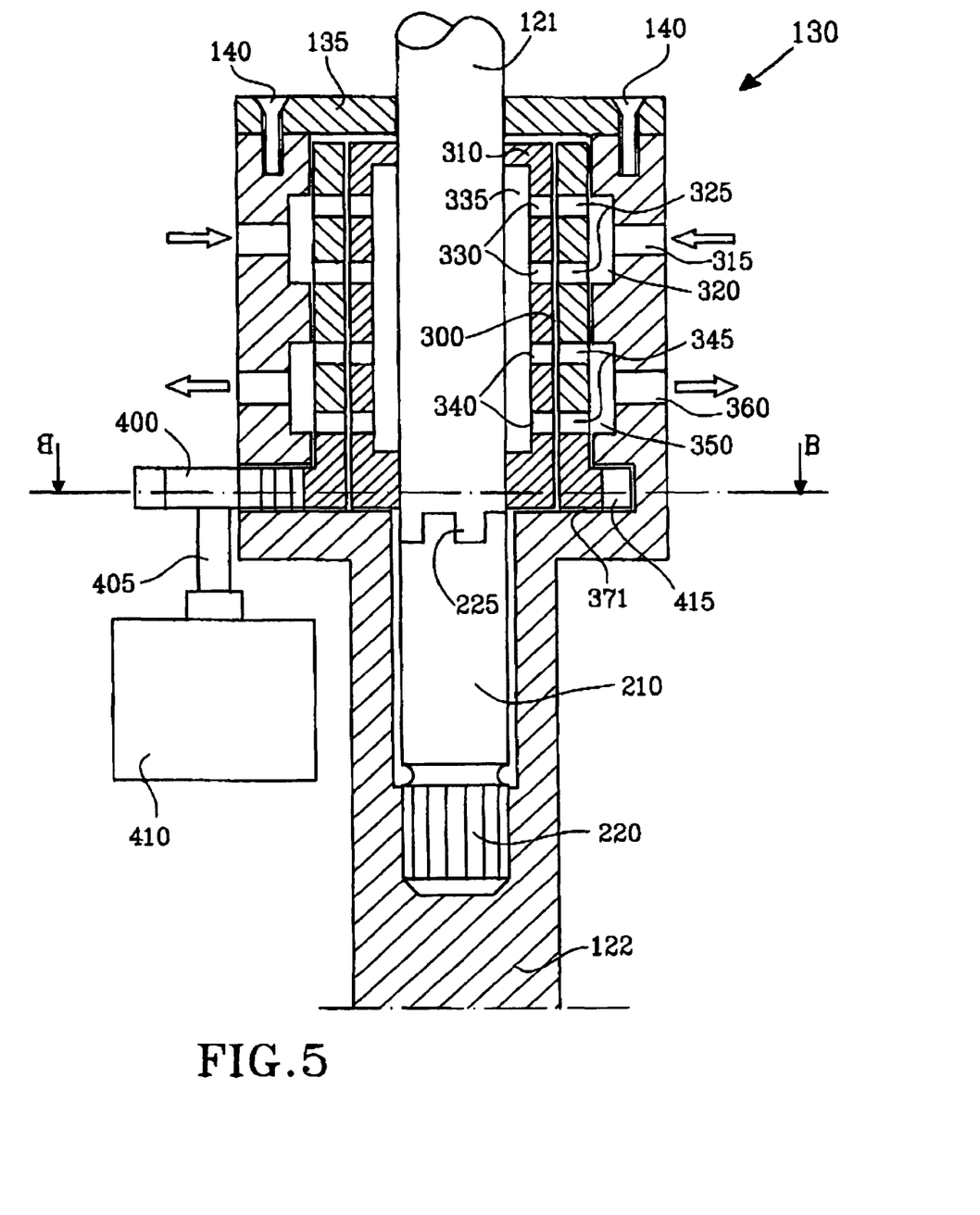
FIG. 5 shows a second embodiment of the present invention.

In a second embodiment of the present invention the rotary valve 300 as illustrated in FIGS. 2, 3 and 4 may be adapted to have the first cylindrical valve member 305 rotated an offset angle $\alpha_{off}$ by a cog wheel or a similar toothed device. This may be accomplished by the arrangement illustrated in FIG. 5 showing a cog wheel 400 operatively connected to a cog wheel shaft 405 that is operatively connected to an electric stepping motor 410 or a piezoelectric or magnetostrictive motor or similar, where the electric motor 410 in turn is attached to the pinion shaft 122 for rotating together with the shaft 122.

Figure 6:
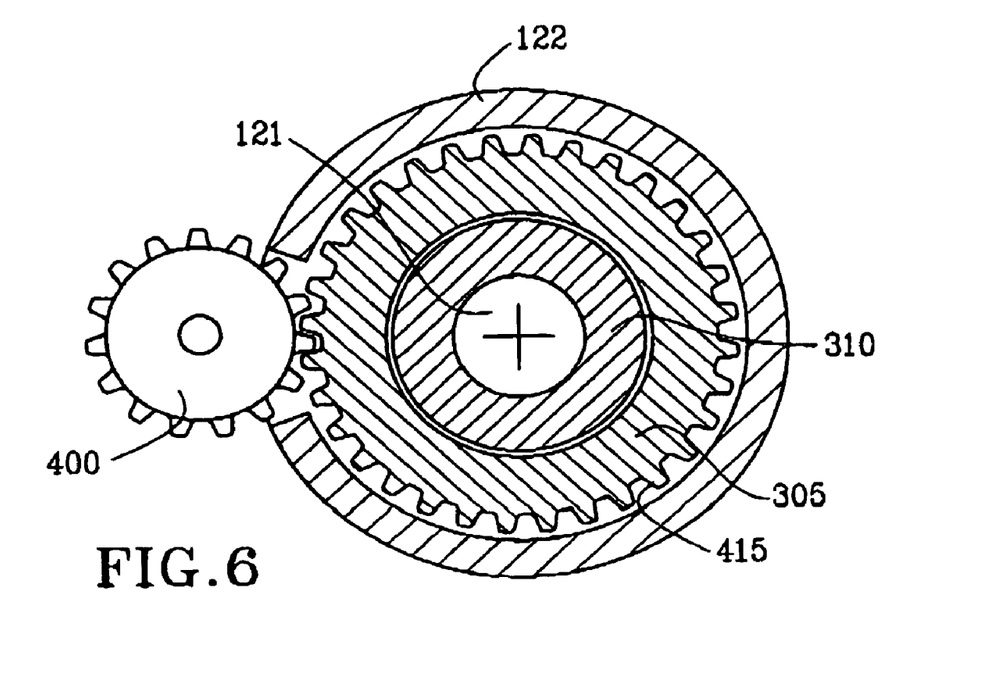
FIG. 6 shows a cross section of a part of the second embodiment, cut through the line B-B in FIG. 5.

According to this embodiment the first cylindrical valve member, 305 is adapted so as to be provided with a cogged ring 415 or a similar toothed device for interaction with the cog wheel 400 or similar. The flange portion 370 has consequently been omitted in this second embodiment. The arrangement in FIG. 5 is further illustrated in FIG. 6, showing a cross section of the cog wheel 400 and the cogged ring 415 cut through the line B-B in FIG. 5. Hence, once the cog wheel 400 has rotated the first cylindrical valve member 305 an offset angle $\alpha_{off}$ the first cylindrical valve member 305 will rotate together with the pinion shaft 122, however possibly displaced by an small angle $\alpha_{off}$ with respect to the pinion shaft 122.

The second embodiment makes it possible to have the first cylindrical valve member 305 rotated an offset angle $\alpha_{off}$ by commanding the electric motor 410 to rotate the cog wheel 400 an appropriate angle $\alpha_{cog}$. Consequently, by commanding the motor 410 to dynamically change the rotation angle $\alpha_{cog}$ of the cog wheel 400 it is possible to dynamically adjust the assist force $F_{ass}$, corresponding to an angle $\alpha_A$, with a certain amount of assist force $\pm F_{\Delta ass}$, corresponding to an offset angle $\pm\alpha_{off}$, so that an appropriate assist force $F_{ass} \pm F_{\Delta ass}$ is delivered by the servo-motor 129 to fit the specific driving scenario, where a control mechanism determines the offset angle $\alpha_{off}$ depending on at least one external or internal vehicle input parameter, e.g. vehicle speed, vehicle acceleration, vehicle turning angle etc. The choice of control mechanism is not important to the present invention and it may e.g. be any suitably programmed computer system.

It should be noted that the second embodiment is essentially similar to the first embodiment as described above, except for the adaptations now mentioned.

In a third embodiment of the present invention a rotary valve 300 as illustrated in FIG. 2-4 may be adapted to have the first cylindrical valve member 305 rotated an offset angle $\alpha_{off}$ by moving the valve member 305 up and/or down.

Figure 7:
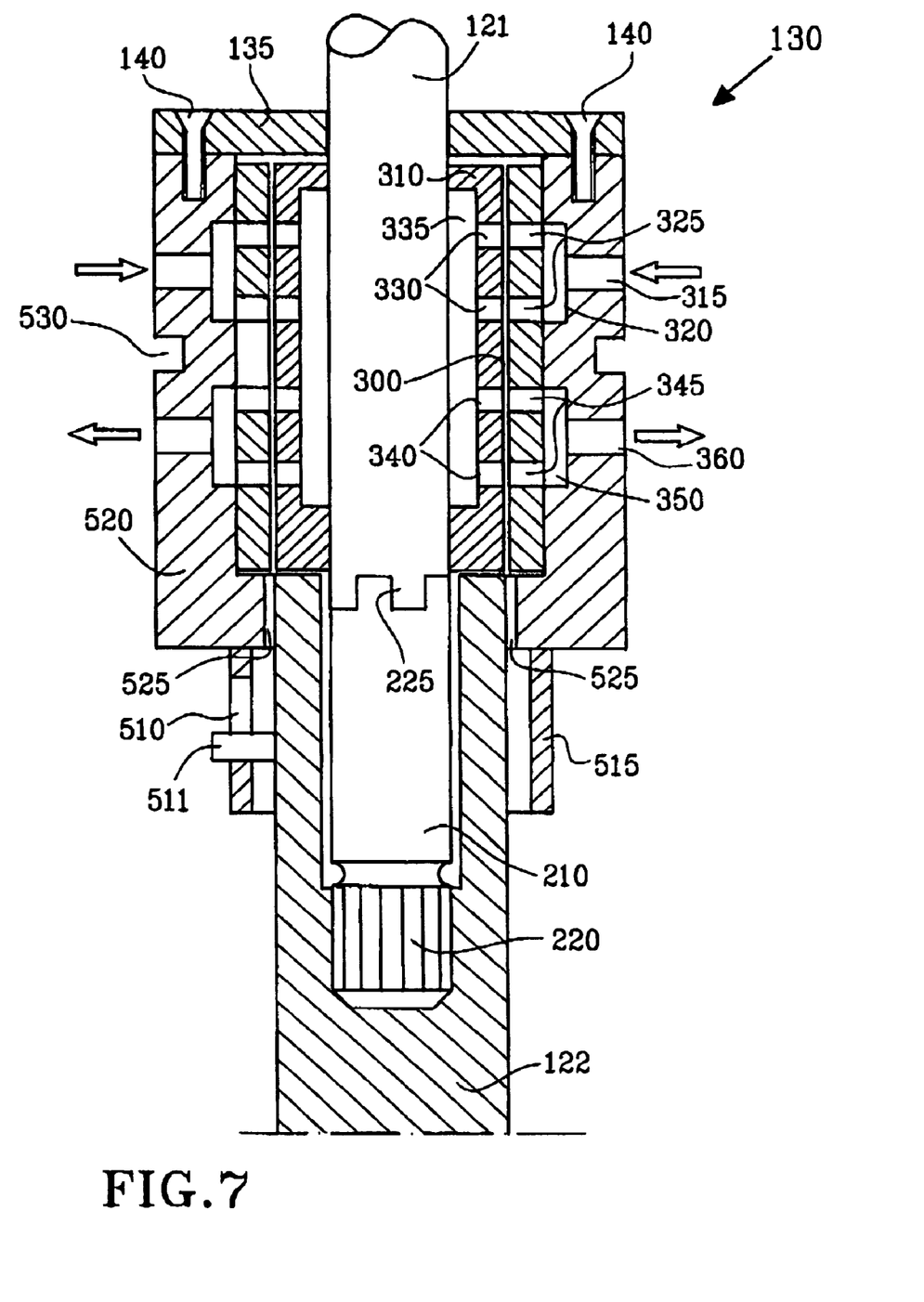
FIG. 7 shows a third embodiment of the present invention.

This may be accomplished by non-rotatably attaching the first cylindrical valve member 305 to a valve house 520 that i.a. encases the first and second cylindrical valve members 305, 310 as shown in FIG. 7. The valve house 520 may somewhat be similar to the extension of the pinion shaft 122 shown in FIG. 2, which i.a. encases the first and second cylindrical valve members 305, 310. However, the valve house 520 is arranged so that it may freely rotate a small offset angle $\alpha_{off}$ with respect to the pinion shaft 122. This is illustrated in FIG. 7 by the small empty space 525 that cylindrically surrounds the top of the pinion shaft 122 and which consequently separates the lower end of the valve house 520 from the pinion shaft 122.

Figure 8:
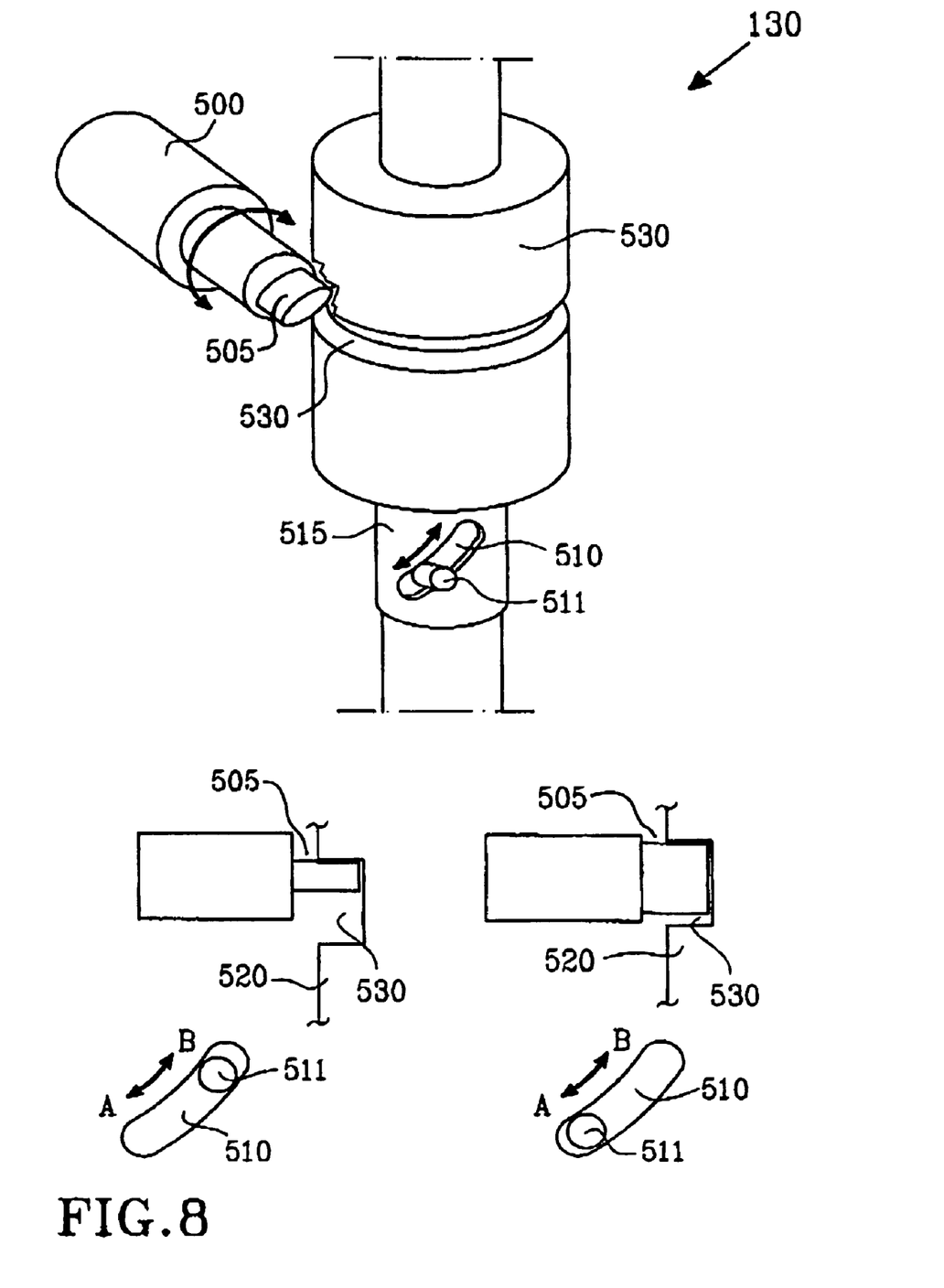
FIG. 8 shows a diagrammatic view of the third embodiment.

The valve house 520 in this third embodiment may be rotated a small offset angle $\alpha_{off}$ with respect to the pinion shaft 122 according to the arrangement illustrated in FIG. 8. The arrangement comprises an electric stepping motor 500 or a piezoelectric or magnetostrictive motor or similar that may be arranged in a position that is separated from the steering assembly. The electric motor 500 may rotate an eccentric axis 505, e.g. an oval axis or rectangular axis or similar, that engages a guide flange 530 or similar that is arranged on the outer periphery of the valve house 520. Since the axis 505 is eccentric a rotation $\alpha_{ecc}$ of the axis 505 in the guide flange 530 will cause the valve house 520 to move up and/or down.

The rotational movement of the valve house 520 is then preferably obtained by a diagonal track or slot 510, e.g. arranged as a cylindrical flange portion 515 that is arranged to extend axially downward from the lower part of the valve house 520, where the slot 510 is guided by a rivet 511 or some other suitable guiding device that is arranged on the pinion shaft 122. Hence, when the valve house 520 and the cylindrical flange 515 firmly attached thereto are move up or down by a slight rotation of the eccentric axis 505 that is actuated by the motor 500 this will cause the valve house 520 to rotate as the diagonal slot 510 moves guided by the rivet 511. The valve house 520 and the cylindrical flange 515 may be dynamically moved up and down by the eccentric axis 505 actuated by the electric motor 500 so that the diagonal slot 510 may take any position between position A and position B, as indicated in FIG. 8.

A small movement of the slot 510 guided by the rivet 511 will cause the valve house 520 rotate a small offset angle $\alpha_{off}$ with respect to the pinion shaft 122, where a movement of the slot 510 from position A to position B corresponds to the maximum rotation angle $\alpha_{max}$ of the valve house 520 in this embodiment. This maximum rotation angle $\alpha_{max}$ is similar to the $\alpha_{max}$ previously discussed in connection with the first embodiment and FIG. 4.

Hence, once the eccentric axis 505 has been rotated an angle $\alpha_{ecc}$ by the electric motor 500 to displace the valve house 520 and the first cylindrical valve member 305 attached thereto an offset angle $\alpha_{off}$ the first cylindrical valve member 305 will rotate together with the pinion shaft 122, however possibly displaced by an small angle $\alpha_{off}$ with respect to the pinion shaft 122.

The third embodiment makes it possible to have the first cylindrical valve member 305 rotated an offset angle $\alpha_{off}$ by commanding the electric motor 500 to rotate the eccentric axis 505 an appropriate angle $\alpha_{ecc}$. Consequently, by commanding the motor 500 to dynamically change the rotation angle $\alpha_{ecc}$ of the eccentric axis 505 it is possible to dynamically adjust the assist force $F_{ass}$, corresponding to an angle $\alpha_A$, with a certain amount of assist force $\pm F_{\Delta ass}$, corresponding to an offset angle $\pm \alpha_{off}$, so that an appropriate assist force $F_{ass} \pm F_{\Delta ass}$ is delivered by the servo-motor 129 to fit the specific driving scenario, where a control mechanism determines the offset angle $\alpha_{off}$ depending on at least one external or internal vehicle input parameter, e.g. vehicle speed, vehicle acceleration, vehicle turning angle etc. The choice of control mechanism is not important to the present invention and it may e.g. be any suitably programmed computer system.

It should be noted that the third embodiment is essentially similar to the first embodiment as described above, except for the adaptations now mentioned.

All of the processes and/or apparatus disclosed and claimed herein can be made and executed without undue experimentation in light of the present disclosure. While the processes and/or apparatus of this invention have been described in terms of preferred embodiments, it will be apparent to those of skill in the art that variations may be applied to the apparatus and/or processes and in the steps or in the sequence of steps of the processes described herein without departing from the concept and scope of the invention. All such similar substitutes and modifications apparent to those skilled in the art are deemed to be within the scope and concept of the invention.

What is claimed is:

1. A hydraulic power assisting steering apparatus comprising a valve that is arranged to be actuated depending on an applied torque for altering pressure of an hydraulic fluid to be received by a hydraulic power steering system for applying a steering assist force, wherein the valve is arranged to be dynamically further actuated depending on at least one external or internal vehicle input parameter;
   wherein the valve is arranged to be dynamically further actuated by displacement of a first valve member relative to a second valve member;
   wherein said first valve member is arranged to be axially displaced with respect to a shaft in the hydraulic power steering system;
   wherein said first valve member is arranged to be electromechanically displaced by means of an electric motor; and
   wherein the electric motor is arranged to actuate a cam that is arranged to move the first valve member, the cam being arranged to rotatably engage with a guide portion arranged on the first valve member to cause axial displacement of the first valve member upon rotation of the cam.

2. A hydraulic power assisting steering apparatus comprising a valve that is arranged to be actuated depending on an applied torque for altering pressure of an hydraulic fluid to be received by a hydraulic power steering system for applying a steering assist force, wherein the valve is arranged to be dynamically further actuated depending on at least one external or internal vehicle input parameter;
   wherein the valve is arranged to be dynamically further actuated by displacement of a first valve member relative to a second valve member;
   wherein said first valve member is arranged to be axially and rotationally displaced with respect to a shaft in the hydraulic power steering system;
   wherein said first valve member is arranged to be electromechanically displaced by means of an electric motor;
   wherein the electric motor is arranged to actuate a cam that is arranged to move the first valve member, the cam being arranged to rotatably engage with a guide portion arranged on the first valve member to cause axial displacement of the first valve member upon rotation of the cam; and
   wherein a pin-and-slot arrangement causes rotational displacement of said first valve member with respect to said shaft as said cam causes axial displacement of said first valve member with respect to said shaft.

* * * * *